United States Patent
Oh et al.

(10) Patent No.: US 8,184,114 B2
(45) Date of Patent: May 22, 2012

(54) MULTI-PANEL DISPLAY DEVICE AND METHOD OF DRIVING THE SAME

(75) Inventors: Eui Yeol Oh, Seoul (KR); Nam Yong Gong, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 464 days.

(21) Appl. No.: 12/469,808

(22) Filed: May 21, 2009

(65) Prior Publication Data

US 2010/0128020 A1    May 27, 2010

(30) Foreign Application Priority Data

Nov. 25, 2008 (KR) .................. 10-2008-0117366

(51) Int. Cl.
*G09G 5/00* (2006.01)
(52) U.S. Cl. ............ 345/213; 345/1.1; 345/1.2; 345/4
(58) Field of Classification Search ............ 345/1.1–1.3, 345/4–9, 213
See application file for complete search history.

(56) References Cited

U.S. PATENT DOCUMENTS

| | | | | |
|---|---|---|---|---|
| 6,107,984 A * | 8/2000 | Naka et al. | | 345/99 |
| 6,501,441 B1 * | 12/2002 | Ludtke et al. | | 345/1.1 |
| 7,071,620 B2 * | 7/2006 | Devos et al. | | 313/512 |
| 2001/0006375 A1 * | 7/2001 | Tomooka et al. | | 345/4 |
| 2004/0109084 A1 * | 6/2004 | Koh | | 348/383 |
| 2005/0057434 A1 * | 3/2005 | Youn | | 345/1.3 |
| 2005/0225669 A1 * | 10/2005 | Tsai et al. | | 348/383 |
| 2005/0280601 A1 * | 12/2005 | Fukue | | 345/1.1 |
| 2007/0285342 A1 * | 12/2007 | Morikawa et al. | | 345/1.3 |
| 2008/0030615 A1 * | 2/2008 | Vasquez et al. | | 348/446 |
| 2008/0211825 A1 * | 9/2008 | Sunakawa et al. | | 345/581 |
| 2009/0002263 A1 * | 1/2009 | Pasetto | | 345/1.3 |
| 2009/0096711 A1 * | 4/2009 | Jang et al. | | 345/1.3 |

* cited by examiner

*Primary Examiner* — Amare Mengistu
*Assistant Examiner* — Premal Patel
(74) *Attorney, Agent, or Firm* — Morgan, Lewis & Bockius LLP

(57) ABSTRACT

A multi-panel display device and a method of driving the same, which can simplify a driving circuit for driving multiple flat panel display devices, thereby decreasing the fabrication cost, are disclosed. In the device configured of an alignment of multiple flat panel display devices for representing a single image, the device comprises multiple flat panel display devices, wherein each flat panel display device includes a display panel configured of a plurality of pixel regions, a data driver driving a plurality of data lines provided in the display panel, and a timing controller receiving image data and synchronization signals from an external source so as to divide the received image data, converting a signal frequency of at least one of the synchronization signals, and converting a size of the divided image data in accordance with the frequency-converted synchronization signal, thereby providing the size-converted divided image data to the data driver.

7 Claims, 6 Drawing Sheets

MULTI-PANEL DISPLAY DEVICE AND METHOD OF DRIVING THE SAME

This application claims the benefit of the Korean Patent Application No. 10-2008-0117366, filed on Nov. 25, 2008, which is hereby incorporated by reference as if fully set forth herein.

BACKGROUND OF THE INVENTION

1. Field of the Invention

The present invention relates to a multi-panel display device and a method of driving the same that can represent a single image using multiple flat panel display devices, and more particularly, to a multi-panel display device and a method of driving the same that can simplify a driving circuit for driving multiple flat panel display devices, thereby decreasing the fabrication cost.

2. Discussion of the Related Art

In today's information-oriented society, a flat panel display device acts as a medium for delivering visual information. And, with the growing importance of such media, various types of flat panel display devices are being developed. Recently, liquid crystal display (LCD) devices, field emission display (FED) devices, plasma display panel (PDP) devices, and light emitting display (LED) devices have been noted as the most prominent types of flat panel display devices. Among the many display devices, the liquid crystal display device have been extending its scope of application with its characteristics of excellent resolution, color display, and picture quality, thin and light-weight structure, and low power consumption. The liquid crystal display device broadly consists of a liquid crystal display panel having liquid crystal cells aligned in a matrix formation so as to display images, a back light unit for emitting light rays onto the liquid crystal panel, and a driving circuit unit for driving the liquid crystal panel. Such liquid crystal display device may adjust light transmissivity of the liquid crystal cells based upon a video signal, thereby displaying the image.

Recently, the liquid crystal display device and many other flat panel display devices have been configured in multiple panel structure, so as to be used as a multi-panel display device for representing a single image. However, the related art multi-panel display device, which represents a single image by using a plurality of flat panel display devices, has been found to be disadvantageous in that the device requires a conversion board, such as a scaler, corresponding to each of the flat panel display devices configured therein. More specifically, each conversion board respective of each flat panel display device is provided with video data respectively inputted through a video data distributor, then converts the provided video data to fit (or be in correspondence with) the position, size, and driving frequency of each display device, thereby providing the converted video data to each display device. In other words, each conversion board receives video data from the video data distributor, detects the video data that matches (or is in correspondence with) the position of each conversion board, then converts the corresponding video data to fit the size of each conversion board, thereby providing the converted video data to each display device.

As described above, since the related art multi-panel display device requires an image distributor for distributing video data to each display device used therein, and also a conversion board, such as a scaler, the structure of the driving circuit and the method of driving the display device eventually become complicated. Particularly, since a scaler or a conversion board includes an analog-to-digital (A/D) converter, a frequency converter, a decoding circuit, a digital-to-analog (D/A) converter, a high capacity memory unit, and a scale conversion circuit, problems such as an increase in fabrication cost and a decrease in production efficiency may occur.

SUMMARY OF THE INVENTION

Accordingly, the present invention is directed to a multi-panel display device and a method of driving the same that substantially obviate one or more problems due to limitations and disadvantages of the related art.

An object of the present invention is to provide a multi-panel display device and a method of driving the same that can simplify a driving circuit for driving the multiple flat panel display devices, thereby decreasing the fabrication cost.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a multi-panel display device configured of an alignment of multiple flat panel display devices for representing a single image, the multi-panel display device comprises multiple flat panel display devices, wherein each flat panel display device includes a display panel configured of a plurality of pixel regions, a data driver driving a plurality of data lines provided in the display panel, and a timing controller receiving image data and synchronization signals from an external source so as to divide the received image data, converting a signal frequency of at least one of the synchronization signals, and converting a size of the divided image data in accordance with the frequency-converted synchronization signal, thereby providing the size-converted divided image data to the data driver.

Herein, the timing controller may include a data modulator dividing the video data enabling the divided video data to correspond to a structural position and size of a respective flat panel display device, and performing size expansion-conversion or size reduction-conversion on the divided video data with respect to the frequency-converted synchronization signal, thereby generating converted video data, a data alignment unit using at least one of the synchronization signals so as to align the converted video data with respect to the operation of the display panel, thereby providing the aligned converted video data to the data driver, and a control signal generator using at least one of the synchronization signals so as to generate a data control signal, and providing the generated data control signal to the respective data driver.

Also, the data modulator may include an ID set-up unit internally setting up an ID signal based upon structural position and size information for each flat panel display device, the information being pre-programmed by a user, thereby storing and outputting the set up ID signal, a frequency converter performing expansion-conversion or reduction-conversion on a signal frequency of at least one of the synchronization signals, thereby generating a frequency-converted synchronization signal, and an image converter detecting and dividing the video data with respect to the ID signal, and expanding or reducing the size of the divided video data with respect to the frequency-converted synchronization signal, thereby providing the size-converted divided video data to the data alignment unit. Herein, the data modulator may further include one of a frame memory and a line memory storing the divided video data, and outputting the stored divided video data in at least one pixel unit for a plurality of times.

The plurality of flat panel display devices may be aligned to be formed in at least one of 1×2, 2×1, 2×2, 4×4, 4×5, n×m alignment formations (wherein m and n are integers being equal to or different from one another, and wherein m≦0 and n≦0), and, regardless of the alignment formation, the plurality of flat panel display devices may be connected to one another either in parallel or in series, or in a combination of parallel/serial connection, so as to be simultaneously provided with the video data and the synchronization signals, thereby displaying a single image.

In another aspect of the present invention, in a method of driving a multi-panel display device configured of an alignment of multiple flat panel display devices for representing a single image, the method of driving the multi-panel display device, wherein a method of driving the multiple flat panel display devices include driving a plurality of data lines provided in a display panel, and receiving image data and synchronization signals from an external source so as to divide the received image data, converting a signal frequency of at least one of the synchronization signals, and converting a size of the divided image data in accordance with the frequency-converted synchronization signal, thereby providing the size-converted divided image data to the data driver.

The converting a size of the divided image data may include converting a signal frequency of at least one of the synchronization signals, and performing size expansion-conversion or size reduction-conversion on the divided video data with respect to the frequency-converted synchronization signal, so as to be in correspondence with the frequency-converted synchronization signal, thereby generating converted video data.

Furthermore, the generating converted video data may include internally setting up an ID signal based upon structural position and size information for each flat panel display device, the information being pre-programmed by a user, thereby storing and outputting the set up ID signal, performing expansion-conversion or reduction-conversion on a signal frequency of at least one of the synchronization signals, thereby generating a frequency-converted synchronization signal, and detecting and dividing the video data with respect to the ID signal, and expanding or reducing the size of the divided video data with respect to the frequency-converted synchronization signal, thereby generating the converted video data. Herein, the generating converted video data may further include storing the divided video data and outputting the stored divided video data in at least one pixel unit for a plurality of times by using one of a frame memory and a line memory.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
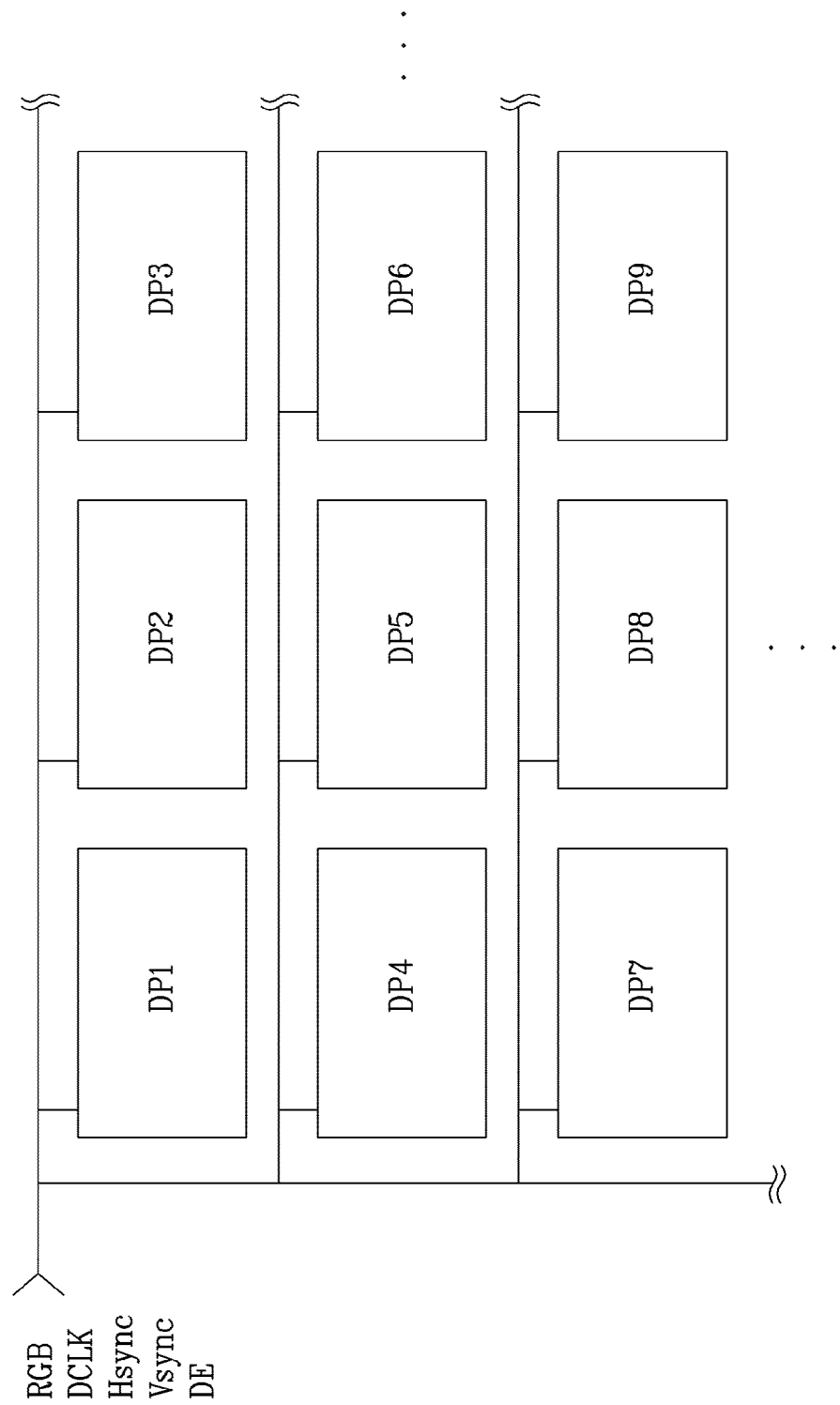
FIG. 1 illustrates a block view showing the structure of a multi-panel display device according to an embodiment of the present invention.

Hereinafter, the multi-panel display device and the method of driving the same will now be described in detail with reference to the accompanying drawings. FIG. 1 illustrates a block view showing the structure of a multi-panel display device according to an embodiment of the present invention. As shown in FIG. 1, the multi-panel display device according to the present invention is configured of multiple display devices (DP1 to DP9), which are aligned in a 3×3 formation or in a larger formation. Thus, the multi-panel display device can represent a single image based upon video data (RGB) and synchronization signals (DCLK, Hsync, Vsync, and DE) received from an external source. Herein, the structural formation of the multiple display devices (DP1 to DP9) is not only limited to 3×3 and may be formed in other formations of different sizes and shapes, such as 1×2, 2×1, 2×2, 4×4, 4×5, n×m (wherein m and n are integers being equal to or different from one another and wherein m≦0 and n≦0).

The plurality of display devices (DP1 to DP9) are connected to one another either in parallel or in series, or in a combination of parallel/serial connection, regardless of the alignment formation, thereby being simultaneously provided with the video data (RGB) and the synchronization signals (DCLK, Hsync, Vsync, and DE), which are received from an external source. Then, the inputted video data (RGB) are divided and converted, based upon the size of the inputted video data (RGB), the total size of the multi-panel display device, the size and alignment position of each display device (DP1 to DP9), so as to display the received video data as a single image. As described above, in the multi-panel display device according to the present invention, which represents a single image, liquid crystal display (LCD) devices, field emission display (FED) devices, plasma display panel (PDP) devices, or light emitting display (LED) devices may be used as the plurality of display devices (DP1 to DP9). However, an example of using liquid crystal display device as the multiple display devices (DP1 to DP9) will be proposed in the description of the present invention.

Figure 2:
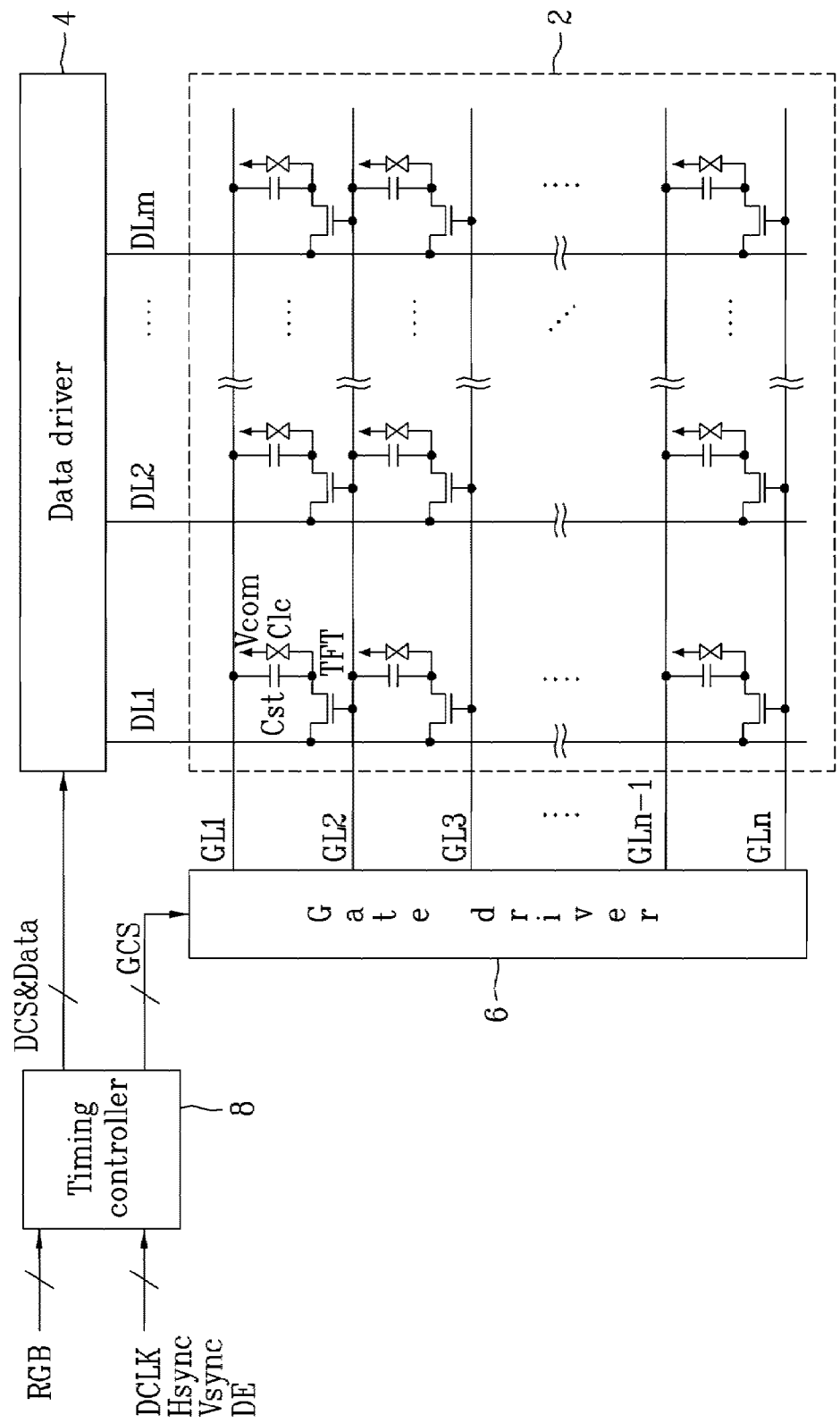
FIG. 2 illustrates a detailed block view showing the structure of one of the multiple flat panel display devices shown in FIG. 1.

FIG. 2 illustrates a detailed block view showing the structure of one of the multiple flat panel display devices shown in FIG. 1. Herein, the display device shown in FIG. 2 corresponds to a 7$^{th}$ display device (DP7) among the plurality of display devices (DP1 to DP9) shown in FIG. 1. Referring to FIG. 2, an example of using a liquid crystal display device is used as the 7$^{th}$ display device (DP7), which will now be described in detail. The 7$^{th}$ display device (DP7) shown in FIG. 2 includes a liquid crystal display panel 2, a data driver 4, a gate driver 6, and a timing controller 8. Herein, the liquid crystal display panel 2 is configured of a plurality of pixel regions. The data driver 4 drives a plurality of data lines (DL1 to DLm), and the gate driver 6 drives a plurality of gate lines (GL1 to GLn). And, the timing controller 8 divides the video data (RGB) inputted from an external source into predetermined regions, converts a signal frequency of at least one of the synchronization signals (DCLK, Hsync, Vsync, and DE) inputted from an external source, and converts the size of the divided video data based upon the frequency-converted signal, thereby providing the converted signal to the data driver 4.

The liquid crystal display panel 2 is provided with a thin film transistor (TFT) formed in each pixel region, which is defined by the plurality of data lines (DL1 to DLm) and the plurality of gate lines (GL1 to GLn), and a liquid crystal capacitor (Clc) connected to the thin film transistor (TFT). The liquid crystal capacitor (Clc) includes a pixel electrode, which is connected to the TFT, and a common electrode facing the pixel electrode. Herein, the liquid crystals are placed between the pixel electrode and the common electrode. The TFT responds to a scan pulse received from each of the gate lines (GL1 to GLn), so as to provide a video signal received from each of the data lines (DL1 to DLm) to the pixel electrode. The liquid crystal capacitor (Clc) charges a difference in voltage between the video signal provided to the pixel electrode and the common voltage provided to the common electrode, and then varies the alignment of the liquid crystal molecules based upon the difference in voltage, so as to adjust the light transmissivity, thereby realizing the gradation (or gray level) of a displayed image. Furthermore, a storage capacitor (Cst) is connected in parallel to the liquid crystal capacitor (Clc), so that the voltage charged to the liquid crystal capacitor (Clc) can be maintained until a next data signal is provided. The storage capacitor (Cst) is formed by having the pixel electrode overlap with a previous gate line. Herein, an isolation layer is provided between the pixel electrode and the previous gate line. Conversely, the storage capacitor (Cst) may also be formed by having the pixel electrode overlap with a storage line. Herein, an isolation layer is provided between the pixel electrode and the storage line.

Just as the timing controllers configured in other liquid crystal display devices, the timing controller 8 of the multi-panel display device according to the present invention simultaneously receives video data (RGB) and synchronization signals (DCLK, Hsync, Vsync, and DE) from an external source. The timing controller 8 divides the inputted video data (RGB) based upon the position of the corresponding liquid crystal display device and, at the same time, expands and converts (or performs expansion-conversion on) the signal frequency of at least one of the externally inputted synchronization signals (DCLK, Hsync, Vsync, and DE), such as the signal frequencies of the dot clock (DLCK) and the horizontal synchronization signal (Hsync). Thereafter, the timing controller 8 expands or reduces the size of the divided video data with respect to the frequency-converted dot clock (DLCK) and horizontal synchronization signal (Hsync).

Furthermore, the timing controller 8 aligns the expansion-converted video data to be adequate (or suitable) for the operation of the liquid crystal display panel 2, thereby providing the aligned video data to the data driver 4. Simultaneously, the timing controller 8 uses at least one of the synchronization signals (i.e., the dot clock (DCLK), the data enable signal (DE), the horizontal synchronization signal (Hsync), and the vertical synchronization signal (Vsync)), so as to generate gate and data control signals (GCS and DCS). Then, the timing controller 8 respectively provides the generated gate and data control signals (GCS and DCS) to the gate driver 6 and the data driver 4, thereby controlling the gate driver 6 and the data driver 4. The structure and operation of the timing controller 8 will be described in more detail later on with reference to the corresponding drawings.

The data driver 4 uses a data control signal (DCS), e.g., a source start pulse (SSP), a source shift clock (SSC), a source output enable (SOE) signal, received from the timing controller 8 so as to convert the data aligned by the timing controller 8 to an analog voltage (i.e., a video signal). More specifically, based upon the SSC, the data driver 4 latches the data, which have been gamma-converted and aligned by the timing controller 8. Then, the data driver 4 responds to the SOE signal, thereby providing each data line (DL1 to DLm) with a portion of the video signal corresponding to one horizontal line for each horizontal period, during which a scan pulse is provided. At this point, based upon the gray-level value of the aligned data, the data driver 4 selects a gamma voltage having a predetermined level of a positive or negative polarity. Then, the data driver 4 provides each data line (DL1 to DLm) with the selected gamma voltage via the image signal.

The gate driver 6 responds to a gate control signal (GCS), e.g. a gate start pulse (GSP), a gate shift clock (GSC), a gate output enable (GOE) signal, received from the timing controller 8 so as to sequentially generate scan pulses, thereby respectively providing the generated scan pulses to each of the gate lines (GL1 to GLn). In other words, the gate driver 6 shifts the GSP received from the timing controller 8 in accordance with the GSC, thereby sequentially providing a scan pulse (e.g., a gate-on voltage) to the gate lines (GL1 to GLn). Furthermore, a gate-off voltage is provided during the period when the gate-on voltage is not provided to the gate lines (GL1 to GLn). Herein, the gate driver 6 performs controls the pulse width of the scan pulses in accordance with the GOE signal.

Figure 3:
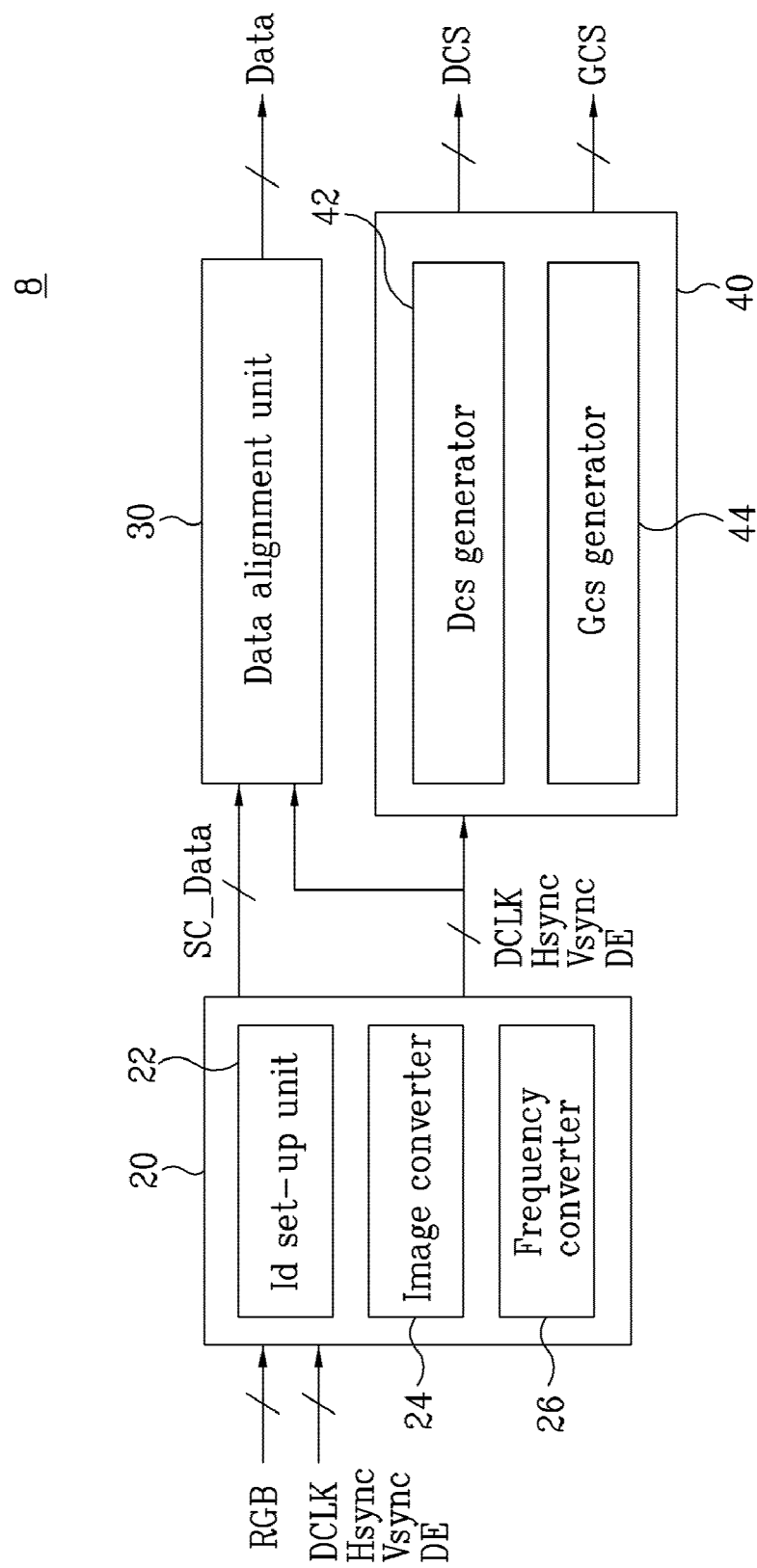
FIG. 3 illustrates a detailed block view showing the structure of a timing controller shown in FIG. 2.

FIG. 3 illustrates a detailed block view showing the structure of a timing controller shown in FIG. 2. The timing controller 8 shown in FIG. 3 divides the video data (RGB) received from an external source so that the divided video data portions can correspond to the structural position and size of each liquid crystal display device. Additionally, the timing controller 8 includes a data modulator 20, a data alignment unit 30, and a control signal generator 40. Herein, the data modulator 20 of the timing controller 8 converts the signal frequency of at least one of the synchronization signals (DCLK, Hsync, Vsync, and DE) inputted from an external source, and expands or reduces the size of the divided video data with respect to the frequency-converted signal, thereby generating converted video data (SC_Data). The data alignment unit 30 uses at least one of the synchronization signals (DCLK, Hsync, Vsync, and DE) to align the converted video data (SC_Data) in accordance with the operation of the liquid crystal panel 2, thereby providing the aligned converted video data (SC_Data) to the data driver 4. And, the control signal generator 40 uses at least one of the synchronization signals (DCLK, Hsync, Vsync, and DE) to generate a data control signal (DCS) and a gate control signal (GCS).

The data modulator 20 internally sets up an ID signal based upon the structural position and size information of each liquid crystal display device, which have been set-up (or pre-programmed) by the user. Also, the data modulator 20 expands and converts the signal frequency of at least one of the synchronization signals (DCLK, Hsync, Vsync, and DE) inputted from an external source, thereby generating a converted synchronization signal. Then, the data modulator 20 detects and divides the video data (RGB) so as to correspond to the ID signal. Additionally, the data modulator 20 expands or reduces the divided video data with respect to the frequency-converted synchronization signal, which is provided to the data alignment unit 30. Herein, the data modulator 20 may either be included in the timing controller 8 or be separately provided. However, in order to simplify the driving circuit, it is preferable that the data modulator 20 is provided in the timing controller 8. The structure and operation of the data modulator 20 will be described in more detail later on with reference to FIG. 3 to FIG. 6.

The data alignment unit 30 receives the expansion-converted video data (SC_Data) and at least one of the synchronization signals (DCLK, Hsync, Vsync, and DE) from the data modulator 20. Then, the data alignment unit 30 uses at least one of the synchronization signals (i.e., the dot clock (DCLK), the data enable signal (DE), the horizontal synchronization signal (Hsync), and the vertical synchronization signal (Vsync)) to align the converted video data (SC_Data) with respect to the size and resolution of the liquid crystal panel 2. Herein, the converted video data (SC_Data) are provided from the data modulator 20 for each horizontal period unit. Furthermore, the data alignment unit 30 sequentially provides the aligned video data to the data driver 4 for each horizontal period unit.

The control signal generator 40 includes a DCS generator 42, which uses at least one of the synchronization signals (DCLK, DE, Hsync, and Vsync) to generate data control signals (DCS), thereby providing the generated data control signals to the data driver 4, and a GCS generator 44, which uses at least one of the synchronization signals (DCLK, DE, Hsync, and Vsync) to generate gate control signals (GCS), thereby providing the generated gate control signals to the gate driver 6. As described above, the DCS generator 42 uses at least one of the synchronization signals (DCLK, DE, Hsync, and Vsync) to generate data control signals (DCS) (i.e., SSP, SSC, SOE, and POL signals), thereby providing the generated data control signals to the data driver 4. The data control signals (DCS) are used to control driving (or operation) timing of the data driver 4. Herein, the POL signal is used to convert the polarity of a video signal being provided to each data line (DL1 to DLm). Furthermore, the GCS generator 44 uses at least one of the synchronization signals (DCLK, DE, Hsync, and Vsync) to generate gate control signals (GCS) (i.e., GSP, GSC, and GOE signals), thereby providing the generated gate control signals to the gate driver 6. The gate control signals (GCS) are used to control driving (or operation) timing of the gate driver 6.

The data modulator 20 includes an ID set-up unit 22, a frequency converter 26, and an image converter 24. More specifically, the ID set-up unit 22 internally sets up an ID signal based upon the structural position and size information of each liquid crystal display device, which have been set up by the user, and then stores and outputs the set up ID signal. The frequency converter 26 expands and converts the signal frequency of at least one of the synchronization signals (DCLK, Hsync, Vsync, and DE), thereby generating a converted synchronization signal. Then, the image converter 24 detects and divides the video data (RGB) so as to correspond to the ID signal. Additionally, the image converter 24 expands the size of the divided video data with respect to the frequency-converted synchronization signal, which is provided to the data alignment unit 30. As described above, in order to expand and convert the video data (RGB), at least one frame memory or line memory (not shown) may be provided either inside or outside of the data modulator 20.

The ID set-up unit 22 receives the structural position and size information of each liquid crystal display device from the user. In other words, when a plurality of liquid crystal display devices are aligned, the user stores in advance (or pre-programs) the structural position and size information of each liquid crystal display device. At this point, the structural position and size information of each liquid crystal display device may be set up by using a remote controller or a dip switch. As described above, when the structural position and size information of each liquid crystal display device are inputted by the user, the ID set-up unit 22 sets up a unique ID signal for each liquid crystal display device, thereby storing and outputting the set-up ID signal.

Figure 4:
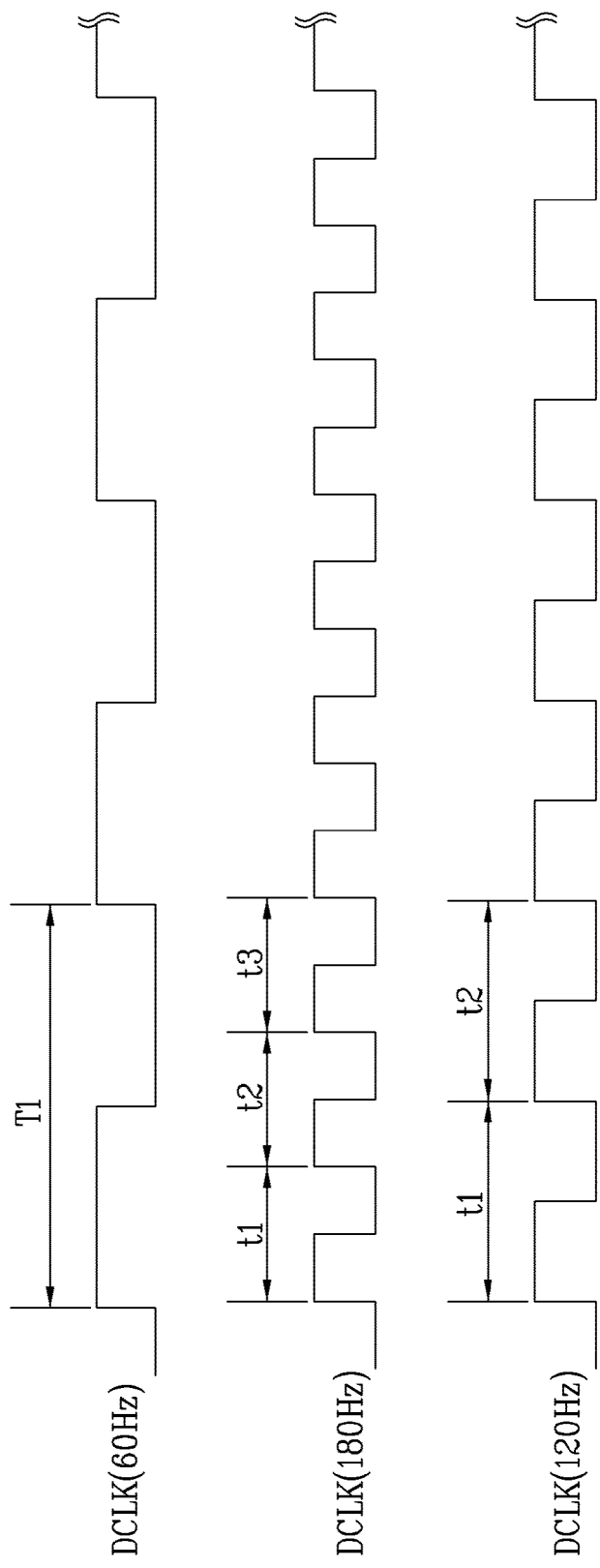
FIG. 4 illustrates a flow chart of a frequency expansion/conversion process of a dot clock among a plurality of synchronization signals.

The frequency converter 26 converts the signal frequency of at least one of the synchronization signals (DCLK, Hsync, Vsync, and DE) by expanding or reducing the signal frequency based upon the size of the corresponding liquid crystal display device included in the respective ID signal, thereby generating a converted synchronization signal. More specifically, as shown in FIG. 4, the frequency converter 26 may perform expansion-conversion or reduction-conversion on the frequency of at least one of the synchronization signals (DCLK, Hsync, Vsync, and DE), such as the frequency of the dot clock (DCLK). In other words, as shown in FIG. 4, when a dot clock (DCLK) is inputted at a frequency of 60 Hz, the frequency converter 26 expands and converts the cycle period of the dot clock (DCLK), so that the dot clock (DCLK) can have a frequency of 120 Hz or 180 Hz. Conversely, the frequency of the inputted signal may be reduced and converted.

When the frequency is expanded and converted to 3 times the inputted frequency (i.e., when the inputted frequency is tripled), one frequency cycle period (T1) of 60 Hz is expanded to first to third frequency cycle periods (t1 to t3) during the same time period, thereby converting the frequency to 180 Hz. Alternatively, when the driving frequency of 60 Hz is expanded and converted to 2 times the inputted driving frequency (i.e., when the inputted frequency is doubled), one frequency cycle period (T1) of 60 Hz is expanded to first and second frequency cycle periods (t1 and t2) during the same time period, thereby converting the frequency to 120 Hz.

In addition to the dot clock (DCLK), the frequency converter 26 can also convert the frequency of the horizontal synchronization signal (Hsync) and the vertical synchronization signal (Vsync). More specifically, the frequency-expanded signal of the horizontal synchronization signal (Hsync) may be provided to a line memory, when the detected video data are vertically expanded. On the other hand, when the detected video data are horizontally expanded, the frequency-converted dot clock or vertical synchronization signal may be used. As described above, the frequency-converted synchronization signal is provided to the image converter 24. Additionally, the frequency converter 26 may also simultaneously provide the externally imputed synchronization signals (DCLK, Hsync, Vsync, and DE) to the data alignment unit 30 and the control signal generator 40.

Figure 5:
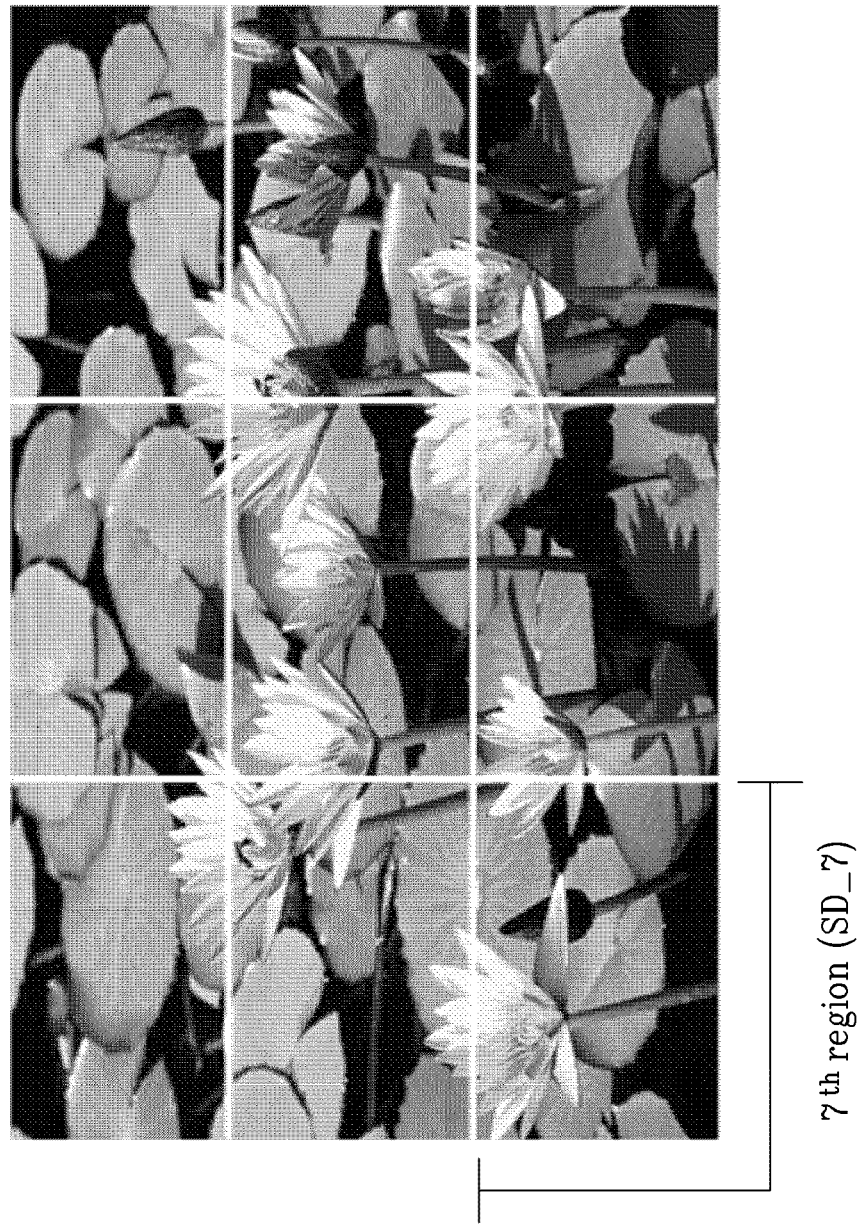
FIG. 5 illustrates an example of a display image represented as a single image of the multi-panel display device according to the present invention.
Figure 6:
FIG. 6 illustrates an exemplary image for describing an image divided from the display image of FIG. 5 and for describing an expansion/conversion method of the divided image.

FIG. 5 illustrates an example of a display image represented in a single screen of the multi-panel display device according to the present invention. And, FIG. 6 illustrates an exemplary image for describing an image divided from the display image of FIG. 5 and for describing an expansion/conversion method of the divided image. Referring to FIG. 5 and FIG. 6, by detecting the video data (RGB) being provided from an external source based upon the ID signal (i.e., the structural position and size information of each liquid crystal display device) received from the ID set-up unit 22, the image converter 24 extracts a divided image data (SD_7). Thereafter, the image converter 24 expands or reduces the divided image data (SD_7) in accordance with the frequency-converted synchronization signal, thereby providing the converted divided image data to the data alignment unit 30.

More specifically, in order to represent (or realize) the whole image (i.e., single image) shown in FIG. 5, the image converter 24 divides the video data (RGB) inputted from an external source to portions having a pre-determined size, so that each divided portion can correspond to the size of the inputted image and to the respective ID signal. For example, when using the image converter 24 of the $7^{th}$ display device (DP7) among the multiple display devices (DP1 to DP9), shown in FIG. 1, the image converter 24 detects the video data of the $7^{th}$ region (SD_7) from the whole video data (RGB) based upon the corresponding ID signal, thereby dividing the divided video data (SD_7). The divided video data (SD_7) may be stored in the above-described frame memory.

Thereafter, the image converter 24 receives the frequency-converted synchronization signal and expands or reduces the divided video data (SD_7), so that the divided video data (SD_7) can correspond to the received converted synchronization signal, thereby generating a converted image data (SC_Data). More specifically, as shown in FIG. 6, the image converter 24 expands the size of the converted image data (SC_Data) (e.g. the resolution of the SC_Data) in accordance with the frequency expansion rate of the synchronization signal in both horizontal and vertical directions. For example, when the frequency of the synchronization signal is expanded from 60 Hz to 120 Hz or from 60 Hz to 180 Hz, the image converter 24 expands the divided video data (SD_7) to 2 times or 3 times its original size with respect to the frequency expansion rate of the synchronization signal. At this point, the expansion of the divided video data (SD_7) can be performed by equally extracting pixel-unit data of the divided video data (SD_7) stored in the frame memory or line memory in both horizontal and vertical directions in accordance with the frequency-converted synchronization signal.

As described above, the multi-panel display device and the method of driving the same according to the present invention have the following advantages. Unlike the related art multi-panel display device, the present invention can extract images and perform expansion-conversion through the timing controller 8 and, more particularly, through the data converter 20 without requiring a separate video data distributor, scaler, or conversion board. Thus, the driving circuit for driving the multi-panel and the method for driving the multi-panel can be simplified, thereby reducing the fabrication cost and enhancing productivity.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. In a multi-panel display device configured of an alignment of multiple flat panel display devices for representing a single image, the multi-panel display device comprising multiple flat panel display devices, wherein each flat panel display device comprises:
   a display panel configured of a plurality of pixel regions;
   a data driver driving a plurality of data lines provided in the display panel; and
   a timing controller receiving image data and synchronization signals from an external source so as to divide the received image data, converting a signal frequency of at least one of the synchronization signals, and converting a size of the divided image data in accordance with the frequency-converted synchronization signal, thereby providing the size-converted divided image data to the data driver,
   wherein the timing controller comprises a data modulator dividing the video data enabling the divided video data to correspond to a structural position and size of a respective flat panel display device, and performing size expansion-conversion or size reduction-conversion on the divided video data with respect to the frequency-converted synchronization signal, thereby generating converted video data,
   a data alignment unit using at least one of the synchronization signals so as to align the converted video data with respect to the operation of the display panel, thereby providing the aligned converted video data to the data driver; and
   a control signal generator using at least one of the synchronization signals so as to generate a data control signal, and providing the generated data control signal to the respective data driver.

2. The multi-panel display device of claim 1, wherein the data modulator comprises:
   an ID set-up unit internally setting up an ID signal based upon structural position and size information for each flat panel display device, the information being pre-programmed by a user, thereby storing and outputting the set up ID signal;
   a frequency converter performing expansion-conversion or reduction-conversion on a signal frequency of at least one of the synchronization signals, thereby generating a frequency-converted synchronization signal; and
   an image converter detecting and dividing the video data with respect to the ID signal, and expanding or reducing the size of the divided video data with respect to the frequency-converted synchronization signal, thereby providing the size-converted divided video data to the data alignment unit.

3. The multi-panel display device of claim 2, wherein the data modulator further comprises:
   one of a frame memory and a line memory storing the divided video data, and outputting the stored divided video data in at least one pixel unit for a plurality of times.

4. The multi-panel display device of claim 1, wherein the plurality of flat panel display devices is aligned to be formed in at least one of 1×2, 2×1, 2×2, 4×4, 4×5, n×m alignment formations (wherein m and n are integers being equal to or different from one another), and, regardless of the alignment formation, the plurality of flat panel display devices are connected to one another either in parallel or in series, or in a combination of parallel/serial connection, so as to be simultaneously provided with the video data and the synchronization signals, thereby displaying a single image.

5. In a method of driving a multi-panel display device configured of an alignment of multiple flat panel display devices for representing a single image, the method of driving the multi-panel display device, wherein a method of driving the multiple flat panel display devices comprises:
   driving a plurality of data lines provided in a display panel; and
   receiving image data and synchronization signals from an external source so as to divide the received image data, converting a signal frequency of at least one of the synchronization signals, and converting a size of the divided image data in accordance with the frequency-converted synchronization signal, thereby providing the size-converted divided image data to the data driver,
   wherein the converting a size of the divided image data comprises converting a signal frequency of at least one of the synchronization signals, and performing size expansion-conversion or size reduction-conversion on the divided video data with respect to the frequency-converted synchronization signal, so as to be in correspondence with the frequency-converted synchronization signal, thereby generating converted video data.

6. The method of claim 5, wherein the generating converted video data comprises:

internally setting up an ID signal based upon structural position and size information for each flat panel display device, the information being pre-programmed by a user, thereby storing and outputting the set up ID signal;

performing expansion-conversion or reduction-conversion on a signal frequency of at least one of the synchronization signals, thereby generating a frequency-converted synchronization signal; and detecting and dividing the video data with respect to the ID signal, and expanding or reducing the size of the divided video data with respect to the frequency-converted synchronization signal, thereby generating the converted video data.

7. The method of claim 6, wherein the generating converted video data further comprises:

storing the divided video data and outputting the stored divided video data in at least one pixel unit for a plurality of times by using one of a frame memory and a line memory.

* * * * *